United States Patent Office 3,317,573
Patented May 2, 1967

---

3,317,573
HETEROCYCLIC ORGANOTIN COMPOUNDS
Walter A. Stamm, Tarrytown, and Arthur W. Breindel, Yonkers, N.Y., assignors to Stauffer Chemical Company, New York, N.Y., a corporation of Delaware
No Drawing. Filed Jan. 22, 1964, Ser. No. 339,345
5 Claims. (Cl. 260—429.7)

This invention relates to organotin compounds and in particular to heterocyclic organotin compounds in which the tin is one of the heterocyclic atoms. The invention also pertains to a method of preparing the aforesaid compounds.

The organotin heterocyclic compounds as contemplated herein are derivatives of a five-membered heterocyclic ring system, the structure of which can be represented by the following chemical formula:

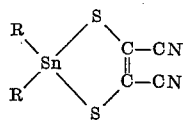

wherein R designates a hydrocarbon radical or residue such as an alkyl radical of from 1 to 18 carbon atoms, e.g. methyl, ethyl, n-propyl, n-butyl, sec.-butyl, n-pentyl, isohexyl, n-hexyl, n-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, etc., an aralkyl radical such as benzyl or phenethyl and an aromatic hydrocarbon radical as exemplified by phenyl and naphthyl.

The organotin heterocyclic compounds of the invention were discovered as the reaction product resulting from the condensation of a disubstituted organotin halide with a salt of dimercaptomaleonitrile. The reaction is deemed to proceed in accordance with the following scheme:

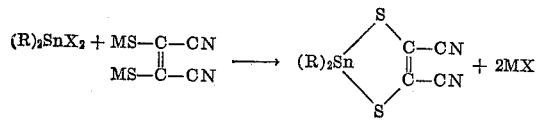

wherein R has the significance as above set forth, X is halogen such as chlorine or bromine and M is an alkali metal such as lithium, potassium, sodium or the like, or an ammonium or substituted ammonium radical. In general, it has been our finding that excellent results are achieved by heating the sodium salt of dimercaptomaleonitrile with the requisite organotin chloride in the presence of a normally liquid, relative polar organic solvent and isolating the so-formed heterocyclic organotin. An especially convenient procedure consists in refluxing the reactants in the solvent which is subsequently distilled off leaving a residue of the desired heterocyclic organotin. Suitable solvents for carrying out the reaction are the normally liquid organic solvents and in this connection reference is made to the lower ketones, e.g. acetone, methyl ethyl ketone and the like, the lower saturated aliphatic alcohols, e.g. methyl alcohol, ethyl alcohol, propyl alcohol, etc., the lower saturated aliphatic ethers and the partial ethers of glycols such as ethylene glycol monomethyl ether, ethylene glycol monoethyl ether and the like.

The heterocyclic organotin compounds of the invention, which generically can be regarded as 1,3-dithia-2-(disubstituted)-stanna-4-cyclopentene, are crystalline solids, generally white to yellowish brown in color and are soluble in numerous organic solvents.

Reference is now made to the following examples which are inserted for purposes of illustration only and those skilled in the art will appreciate that various modifications of the invention can be practiced without departing from the spirit and scope thereof.

EXAMPLE 1

1,3-dithia-2-(di-n-butyl)-stanna-4,5-dicyano-4-cyclopentene

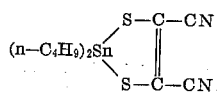

In a 250 ml. flask equipped with a magnetic stirrer and reflux condenser was placed a solution of 9.3 g. (0.05 M) of the disodium salt of dimercaptomaleonitrile in 125 ml. acetone to which was then added dropwise 15.2 g. (0.05 M) of di-n-butyltin dichloride dissolved in 25 ml. of acetone. During the addition, the contents of the flask were thoroughly agitated. Following the introduction of the di-n-butyltin dichloride, the reaction mixture was brought to reflux and so maintained for one hour, followed by cooling to room temperature. The precipitated sodium chloride was separated by filtration and the filtrate distilled at reduced pressure to remove solvent and volatile materials. The desired product was obtained in the form of a residual, light brown solid having a melting point of 155° (dec.). The yield amounted to 55%. Chemical analysis of the isolated product was in consonance with the above depicted structure.

The disodium salt of dimercaptomaleonitrile is a known chemical compound, the description and preparation of which is given in the technical and chemical literature. In this connection, reference is made to Bähr, Ber., 88, page 1771 (1955). The compound is commonly obtained by reacting sodium cyanide in an excess of carbon bisulfide in the presence of dimethylformamide. The disodium dimercaptomaleonitrile is obtained in the form of its dimethylformamide complex which can be hydrolyzed to release the free disodium dimercaptomaleonitrile. For further details on the preparation of this intermediate, reference is made to the aforesaid Berichte publication.

EXAMPLE 2

1,3-dithia-2-(di-n-octyl)-stanna-4,5-dicyano-4-cyclopentene

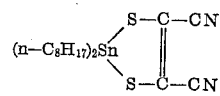

The procedure of Example 1 was again carried out but in this instance an equivalent amount of di-n-octyltin dichloride was used in place of the di-n-butyltin dichloride of the first example. In general, the results and yield paralleled those obtained in Example 1. The product was isolated as a yellow-brown solid in a yield of 51% and having a melting point of 110° C. The chemical analysis of the product confirmed its structure as above shown in the formula.

EXAMPLE 3

1,3-dithia-2-(diphenyl)-stanna-4,5-dicyano-4-cyclopentene

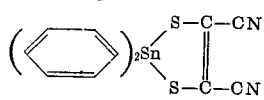

The procedure of Example 1 was again carried out, except that an equivalent amount of diphenyltin dichloride was used as the organotin dihalide. The product was isolated as a brownish yellow solid in a yield of 40%, the melting point of which was greater than 200° C. (dec.). Chemical analysis confirmed the above shown structure.

The organotin heterocyclic compounds of the present invention are new and valuable chemical entities which have a variety of desirable properties which render them useful in the chemical and related arts. Thus, the compounds are characterized by the presence of two cyano substituents which are susceptible to further transformation into other valuable functions such as amides and acids. The presence of a double bond is also a useful reactive site. In addition to their strictly chemical properties, the compounds of the invention find important uses in practical applications. In this connection, we have found them to be excellent stabilizers for such important polymers as the chlorinated polymers, particularly polyvinylchloride.

We claim:

1. A heterocyclic organotin compound of the formula

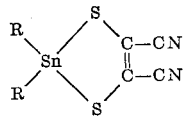

wherein R represents a hydrocarbon radical selected from the class consisting of an alkyl radical of from 1 to 18 carbon atoms, benzyl, phenethyl, phenyl and naphthyl.

2. A heterocyclic organotin compound of the formula

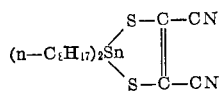

3. A heterocyclic organotin compound of the formula

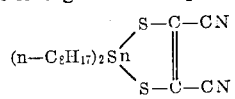

4. A heterocyclic organotin compound of the formula

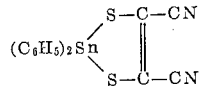

5. A method of preparing a heterocyclic organotin compound of the formula

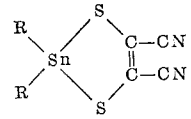

wherein R represents a hydrocarbon radical selected from the class consisting of an alkyl radical of from 1 to 18 carbon atoms, benzyl, phenethyl, phenyl and naphthyl, which comprises reacting a disubstituted organotin halide of the formula $(R)_2SnX_2$ wherein R has the significance as above defined and X is a halogen selected from the class consisting of chlorine and bromine, with a salt of dimercaptomaleonitrile in which the salt is selected from the class of alkali metal and ammonium salts and isolating the so-obtained heterocyclic organotin compound.

No references cited.

TOBIAS E. LEVOW, *Primary Examiner.*

W. F. W. BELLAMY, *Assistant Examiner.*